United States Patent
Sandner et al.

(10) Patent No.: US 7,629,415 B2
(45) Date of Patent: Dec. 8, 2009

(54) HIGHLY CONCENTRATED SELF-EMULSIFYING PREPARATIONS CONTAINING ORGANOPOLYSILOXANES AND ALKYLAMMONIUM COMPOUNDS AND USE THEREOF IN AQUEOUS SYSTEMS

(75) Inventors: Bernhard Sandner, Geretsried (DE); Cristina Stanica, Wolfratshausen (DE); Longying Jiang, Geretsried (DE)

(73) Assignee: Rudolf GmbH & Co. KG Chemische Fabrik, Geretsried (DE)

( * ) Notice: Subject to any disclaimer, the term of this patent is extended or adjusted under 35 U.S.C. 154(b) by 647 days.

(21) Appl. No.: 10/536,720

(22) PCT Filed: Dec. 17, 2003

(86) PCT No.: PCT/EP03/14408

§ 371 (c)(1),
(2), (4) Date: Jan. 27, 2006

(87) PCT Pub. No.: WO2004/055112

PCT Pub. Date: Jul. 1, 2004

(65) Prior Publication Data

US 2007/0012895 A1    Jan. 18, 2007

(30) Foreign Application Priority Data

Dec. 18, 2002   (DE) ................................ 102 59 291

(51) Int. Cl.
*C08G 77/26*   (2006.01)
(52) U.S. Cl. .................. 524/838; 106/287.11; 528/38; 8/DIG. 1; 8/115.58; 8/115.59; 8/115.66; 252/182.3; 427/369; 427/355; 427/377
(58) Field of Classification Search .................. 528/38; 524/838; 8/DIG. 1, 115.58, 115.59, 115.66; 106/287.11; 252/182.3; 427/369, 355, 377
See application file for complete search history.

(56) References Cited

U.S. PATENT DOCUMENTS

| | | | | |
|---|---|---|---|---|
| 6,136,304 A | * | 10/2000 | Pyles | 424/70.28 |
| 6,207,141 B1 | * | 3/2001 | Pyles | 424/70.28 |
| 6,482,399 B2 | * | 11/2002 | Pyles | 424/70.28 |
| 7,223,384 B1 | * | 5/2007 | Decoster et al. | 424/70.1 |
| 7,329,707 B2 | * | 2/2008 | Sandner et al. | 524/838 |
| 2002/0068689 A1 | | 6/2002 | Fender et al. | |

* cited by examiner

*Primary Examiner*—Margaret G Moore
(74) *Attorney, Agent, or Firm*—Buchanan Ingersoll & Rooney PC

(57) ABSTRACT

This invention concerns highly concentrated self-emulsifying preparations containing organopolysiloxanes and alkylammonium compounds and use thereof in aqueous systems on textile substrates. More particularly, this invention concerns preparations consisting of fully or partially quaternized amino-functional organopolysiloxanes, quaternary alkylammonium compounds, if appropriate an organic hydrotrope and if appropriate water.

4 Claims, No Drawings

HIGHLY CONCENTRATED SELF-EMULSIFYING PREPARATIONS CONTAINING ORGANOPOLYSILOXANES AND ALKYLAMMONIUM COMPOUNDS AND USE THEREOF IN AQUEOUS SYSTEMS

RELATED APPLICATIONS

This application claims priorities under 35 U.S.C. §119 to German Application No. 102 59 291.8 filed Dec. 18, 2002, and Under 35 U.S.C. §371 to PCT Application No. PCT/EP2003/014408 filed as an International Application on Dec. 17, 2003 designating the U.S., the entire contents of which are hereby incorporated by reference in their entireties.

This invention concerns highly concentrated self-emulsifying preparations containing organopolysiloxanes and alkylammonium compounds and use thereof in aqueous systems on textile substrates. More particularly, this invention concerns preparations consisting of fully or partially quaternized amino-functional organopolysiloxanes, quaternary alkylammonium compounds, if appropriate an organic hydrotrope and if appropriate water.

Organopolysiloxanes containing amino groups and also organopolysiloxanes bearing quaternized ammonium groups in differing position on the polysiloxane backbone have long been used as textile finishes. Good and soft hand (hereinafter called softness effects) are achieved on textiles treated therewith. An essential prerequisite for use in textile finishing liquors is good dilutability in water and also compatibility with further chemicals frequently present in finishing liquors.

Organopolysiloxanes are generally not soluble in water, even when they bear amino-functional groups in free or quaternized form. Such functional groups improve the emulsifiability of organopolysiloxanes, but do not provide the ability to spontaneously self-emulsify to form macro-, mini- or microemulsions. To make organopolysiloxanes appliable from aqueous media it is therefore usually necessary to add emulsifiers. This is typically done in the prior art by the co-use of nonionic emulsifiers, the amount of which depends on the particular type of emulsion (macro-, mini- or microemulsion).

DE 2631419-C2 describes a textile-treating composition in the form of an aqueous dispersion composed of a softener based on quaternary fatty amine derivatives and of an organopolysiloxane, the latter being present as an aqueous emulsion.

U.S. Pat. No. 5,602,224-A describes the preparation of an organopolysiloxane which contains quaternary fatty amine groups and also reactive silanol and/or alkoxy groups and its use as a solubilizer between silicone oils and quaternary fatty amine derivatives.

WO 00/10524-A1 describes a hair-conditioning composition comprising a very dilute mixture of 0.1%-3% of an organopolysiloxane having a quaternary ammonium group at each end and of 0.2%-6% of a quaternary ammonium compound.

The preparation of aqueous microemulsions from amino-functional organopolysiloxanes is described in WO 88/08436 for example. A mixture of acid-neutralized amino-containing organopolysiloxane, water and emulsifier is heated, and clear microemulsions are obtained.

A further way to produce macro-, mini- or micro-emulsions appliable from aqueous media is to modify the organopolysiloxane molecules with hydrophilic groups which generate spontaneous self-emulsification on addition to aqueous liquors. The hydrophilic groups in molecule-internal positions usually consist of alkylene oxide residues which, in similar form, are also part of nonionic emulsifiers. For instance, EP 1 174 469 A2 teaches the preparation of a hydrophilically modified organopolysiloxane which is prepared by equilibration, with amino-functional silanes and octamethylcyclotetrasiloxane, in the presence of a basic equilibrating catalyst, of a polysiloxane modified laterally with polyoxyalkylene ether groups.

Thus prepared organopolysiloxanes, modified with hydrophilic groups molecule-internally, can be varied with regard to the fraction of hydrophilic component to create compounds which spontaneously self-emulsify to form macroemulsions having particle sizes above 50 nm, microemulsions having particle sizes below 50 nm or, in the extreme case, silicone surfactants which form clear solutions in water. Such compounds are not durable to domestic laundering on account of the high solubility in water.

A significant disadvantage not only of nonionic emulsifiers present in the external, aqueous phase of the macro-, mini- or microemulsions but also of the alkylene oxide residues positioned molecule-internally in organopolysiloxanes is the fact that these moieties always impair the softness of textiles finished therewith. This unpleasant property, moreover, is reinforced by the fact that, in the case of the microemulsions preferred in textile application, the fraction of external emulsifiers, or in the case of organopolysiloxanes modified molecule-internally with hydrophilic groups the molar fraction thereof, has to be very high if the desired particle size of below 50 nm is to be achieved.

Microemulsions produced using nonionic emulsifiers usually have organopolysiloxane concentrations of not more than 30-35 weight percent, since higher concentrations are observed to lead to an increase in viscosity up to a paste-like appearance. To avoid the resulting, commercially disadvantageous, higher transportation and packaging costs, very high product concentrations are desirable.

The presence of nonionic emulsifiers usually also profoundly boosts the foaming tendency of emulsions and application liquors produced therefrom. This also holds for amino-functional polysiloxanes modified with molecule-internal alkylene oxide. This limits utility on high-speed textile-finishing machines, such as jet-dyeing machines for example, since the foam generated in these machines by the high level of agitation appreciably hinders the in-machine transportation of the fabric to be treated and also the mass transfer between treatment liquor and textile substrate.

A further disadvantage is that the presence of alkylene oxide groups increases the thermomigration of disperse dyes on synthetic substrates, which greatly impairs rub fastnesses in particular of deep shades in some instances.

The present invention then has for its object to provide preparations based on organopolysiloxanes which on the one hand are free of external nonionic emulsifiers and are not modified molecule-internally with hydrophilic, nonionic groups either and which on the other hand constitute stable, clear preparations which ensure spontaneous self-emulsification on addition to aqueous application liquors and do not separate during prolonged storage. A suitable compilation of individual components should also enable the production of macro-, mini- and microemulsions. At the same time, the preparations should be in as concentrated a form as possible in order that transportation and packaging costs may be reduced as far as possible.

The present invention further has for its object to select the organopolysiloxane to be used such that there is high stability to residual alkali during the various application operations. Residual alkali in the fiber or yarn interior is a frequent occurrence in textile treatment, for example due to washing operations not being carried out with sufficient care. The often resulting increase in treatment liquor pH to above 9 can lead to emulsion splitting and to coalescence of emulsion particles and their floating as oil droplets on the surface of the treatment liquor. As the finishing process continues, the oil droplets can transfer to the textile material or else be deposited on the rolls of the treatment assemblies. The textiles become stained with silicone spots which are very difficult or impossible to wash off again.

The present invention further has for its object to choose the composition of the preparation such that the stability of the preparation is not reduced when used on finishing machines which exert high shearing forces on the treatment liquor, to thereby avoid similar adverse consequences as caused by a substantial rise in pH for example. It is in particular on state of the art fully or partially flooded jet-dyeing machines that high shearing stresses occur during pumping, which is why, for example, during an exhaust process application for example, it is again possible for emulsion splitting to occur, resulting in the undesirable silicone deposits on the textile substrate. At the same time, foaming should be kept to a minimum during use in these machines in order that optimum fabric transportation and mass transfer in the application machine may be ensured.

The preparations should further demonstrate a significant improvement with regard to softness properties, yellowing inhibition and hydrophilicity on substrates treated therewith. In addition, these requirements should be fulfilled even after repeated domestic laundering operations. Moreover, thermomigration-based rub fastness deteriorations of disperse dyeings on synthetic substrates due to alkylene oxide groups should be avoided.

It has been determined that, unexpectedly, this object is achieved according to the present invention by the use of fully or partially quaternized amino-functional organopolysiloxanes to which have been added alkylammonium compounds with or without an organic hydrotrope and water and which are as defined in claim 1.

The fully or partially quaternized organopolysiloxanes used according to the present invention provide good stabilities under application conditions over a broad pH range (in particular between pH 7 and 12) and good yellowing resistance. The preparations of the present invention further provide excellent softness.

The alkylammonium compounds in the preparations of the present invention and also the organic hydrotrope, if present, assume the offices of the conventionally added nonionic emulsifiers. At the same time, these components effect a reduction in the viscosity of the preparations such that they are easily removed from containers even at high product concentrations and also readily diluted.

The preparations of the present invention possess good stability to shearing stresses on high-speed textile-finishing machines. Furthermore, textiles finished with the preparations of the present invention, especially towels, underwear and sportswear, are notable for high absorbency.

It is exclusively the fully or partially quaternized amino-functional organopolysiloxanes and also the alkylammonium compounds which remain on the textile substrates following a treatment with the preparations mentioned. This combination of active ingredients benefits from the different softness characteristics of the individual components to provide a particularly good fabric hand in that cellulosic substrates, as well as good surficial smoothness, are endowed with a cool, dry softness combined with a pleasantly full, fleecy hand.

When the preparations are microemulsions, internal softness is preferentially obtained due to the low emulsion particle size below 50 nm for the individual components which are able to penetrate deeply into the yarn and fiber material. When the preparations are applied to cellulosic substrates in the form of macroemulsions having particle sizes above 50 nm, the active components (1) and (2) usually preferentially accumulate on the fiber surface. This effect is due to sorption of the water-soluble fractions of the preparation into the fiber interior and the consequent filterative retention or accumulation of the larger particles of the emulsion in the outer layers of the fibers. The substrate hand character which results is altogether fuller and smoother.

On synthetic substrates the differences in softness which are due to different sizes of particles in the emulsion are not as pronounced as on natural substrates. This is due to the morphology of the fibers which, owing to the non-absorbent character of the fibers and their smooth surface, makes it possible for the active components to become exclusively deposited on the fiber surface. The preparations of the present invention create a pleasant, silky and yet full hand on woven and knitted fabrics composed of polyester and polyamide.

A further advantage of preparations according to the present invention is a minimal tendency to produce the kind of yellowing which frequently occurs at drying temperatures above 120° C. in the case of white and light-colored textile substrates conventionally treated with amino-functional polysiloxanes only.

There are many textile applications where hydrophobicity is undesirable. For instance, towels are expected to have not only a good, fleecy softness but also good absorbency to provide an optimal drying effect. Good absorbency is frequently likewise desired for underwear. Similarly, there are many clothing articles in the sports and outdoors sector, such as bicycling or soccer jerseys for example, where absorbency is a prerequisite for the textile base material as well as good softness. Substrates conventionally treated with amino-functional polysiloxanes only are frequently observed to have a pronounced hydrophobic character.

A particular feature to be mentioned in relation to the preparations of the present invention is the excellent hydrophilicity of textile substrates treated therewith.

Therefore, unlike conventional amino-functional polysiloxanes, they can also be used for articles where high absorbency is stipulated.

Thermomigration-based rub fastness deteriorations of disperse dyeings on synthetic substrates are practically avoided according to the present invention on account of the absence of external or molecule-internal nonionic emulsifiers.

A pronounced static charge is frequently to be observed on synthetic textile articles. The preparations of the present invention possess a high charge density for the quaternary components and hence have excellent conductivity which survives repeated domestic laundering operations.

The preparations of the present invention are used on all customary textile substrates. Woven and knitted fabrics composed of natural fibers, such as cotton or wool for example, and also such fabrics composed of synthetic fibers, such as viscose, polyester, polyamide or polyacrylonitrile for example, can be treated.

The term "liquor" used hereinbelow is to be understood as referring to the aqueous treatment or test baths adjusted to the respective desired dilution. These baths may, depending on the particular use desired, comprise the preparations of the present invention in sole form as well as, if appropriate, additions of other fiber finishes customarily used in textile processing.

The preparations of the present invention may be applied for example in a pad application process or in an exhaust process. The pad application process is performed on a padder by drenching the textile substrate with the application liquor, then squeezing it off on the padder to the desired wet pick-up and finally subjecting it to a drying passage. When the preparations of the present invention are applied from the application liquor in an exhaust process, rapid and complete exhaustion of the bath is to be observed owing to the high charge density of the two quaternary components (1) and (2).

The substrates treated with the preparations of the present invention possess not only good initial effects, but also a durability to repeated domestic laundering. The good softness and also the hydrophilicity are very substantially retained.

The invention firstly provides preparations characterized by a content, based on the overall composition, of (1) 40 to 95 percent by weight of a fully or partially quaternized amino-functional organopolysiloxane of the general formula

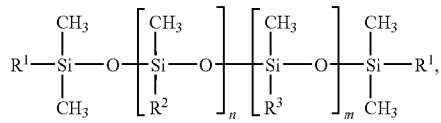

where

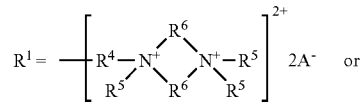

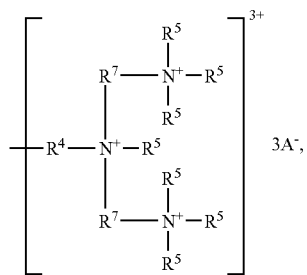

$R^2 = $ —$(CH_2)_o$—NH—$(CH_2)_p$—$NH_2$ or

—$(CH_2)_p$—$NH_2$,

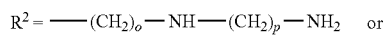

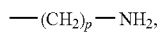

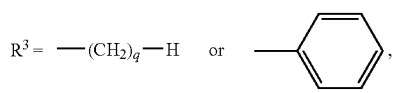

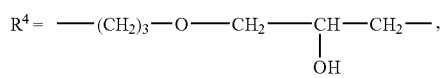

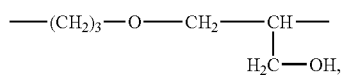

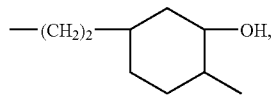

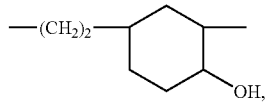

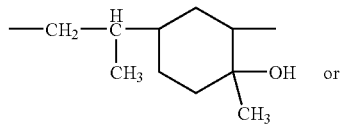

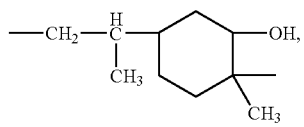

$R^5 = $ —$(CH_2)_r$—H, $R^6 = $ —$(CH_2)_s$—, $R^7 = $ —$(CH_2)_t$—, $A^-$ represents inorganic or organic anions, n represents an integer from 0-20, preferably 0-14, more preferably 0-5, m represents an integer from 20-2000, preferably 40-1000, more preferably 40-200, o and p each represent an integer from 1-10, preferably 2-4, q represents an integer from 1-10, preferably 1, r represents an integer from 1-18, preferably 1, s represents an integer from 2-3, preferably 2, and t represents an integer from 2-5, preferably 2-4, with the proviso that the total nitrogen content of component (1) is in the range from 0.05 to 2.0 percent by weight, based on the overall composition of component (1), (2) 2 to 20 percent by weight of an alkylammonium compound of the general formula

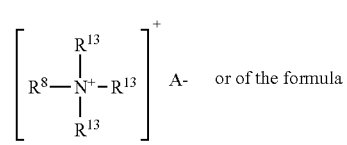

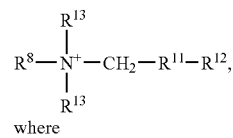

where $R^8 = $ —$R^5$ or —$R^{10}$,

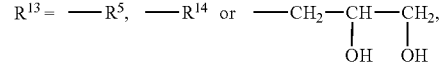

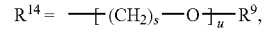

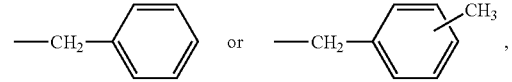

with the proviso that, when $R^8$ and $R^{13}$ in the formulae (A) and (B) are both $R^5$, the nitrogen atom bearing these residues comprises not more than two $R^5$ residues and at least one $R^{14}$ residue,

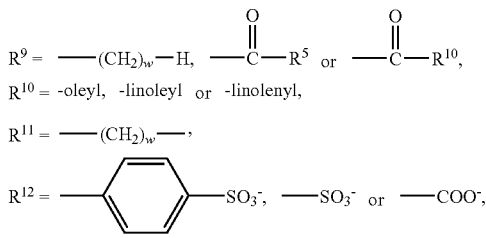

u=1-6, preferably 1-2,
w=0-20
where $A^-$, $R^5$ and s are each as defined in connection with component (1),
0 to 20 percent by weight of an organic hydrotrope, and
(4) 0 to 20 percent by weight of water.

All the weight data for the preparations of the present invention are based on the overall composition of the preparation of the present invention. Preferred ranges are a range of 50-95 and especially 60-90 percent by weight for component (1) and a range of 2-15 and especially 5-15 percent by weight for component (2). When component (3) is added, its concentration is preferably in the range of 1-10 and especially of 2-7 percent by weight. When component (4) is added, its preferred range is 5-20, but especially 10-20 percent by weight.

The nitrogen content of component (1) is preferably 0.1-1.5 percent by weight, but especially 0.1-1.0 percent by weight based on the overall composition of component (1).

The anions $A^-$ are derived from inorganic or organic acids. Examples of inorganic anions include chloride, bromide, iodide and sulfate; chloride and sulfate are preferred. Examples of organic anions are tosylate and acetate; tosylate is preferred.

The fully or partially quaternized amino-functional organopolysiloxanes of component (1) are prepared by methods known to one skilled in the art. When n is 1 or >1 (partially quaternized compounds), these compounds can be synthesized by equilibration of terminally quaternized amino-functional organopolysiloxanes with silane hydrolyzates bearing lateral amino groups, in the presence of known equilibration catalysts. When n is zero (quaternized compounds), these compounds can be prepared from terminally amino-functionally modified organopolysiloxanes by quaternization (after alkylation carried out beforehand if appropriate).

The alkylammonium compound used for component (2) may be fatty acid esters of alkanolamines, quaternized with dimethyl sulfate, benzyl chloride or methyl chloride, including their mixed forms, the fatty acid radical containing between 9 and 23 carbon atoms, but preferably 11-17 carbon atoms. Unsaturated fatty acid radicals having preferably 11-17 carbon atoms in the alkyl chain are likewise suitable. The alkanolamine used may be fully or partially esterified. Partially esterified alkanolamines may still have free hydroxyethyl, hydroxyethylethoxy, hydroxypropyl, hydroxypropylethoxy or hydroxyethyldiethoxy radicals. Useful alkanolamines further include unesterified alkanolamines which are quaternized with the identified alkylating agents and whose free groups may consist of hydroxyethyl, hydroethylethoxy, hydroxypropyl, hydroxypropylethoxy or hydroxyethyldiethoxy radicals.

The optionally used component (3), an organic hydrotrope, may typically be selected from the group of polyfunctional alcohols. It is thus possible to use dialcohols having 2-10 and preferably 2-6 but especially 2-4 carbon atoms per molecule. Also of superior suitability are their mono- and diethers and also the mono- and diesters of these dialcohols. Examples of component (3) which are to be used with particular preference are butyldiglycol, 1,2-propylene glycol and dipropylene glycol, tributoxyethyl phosphate and triisobutyl phosphate.

The preparations of the present invention are produced by simply stirring the components (1) and (2) and, if appropriate, (3) and (4) together at 30-40° C.

The invention further provides for the use of the preparations according to claim 1 in the finishing of textile substrates in aqueous baths and application liquors, if appropriate together with further processing agents. Fabrics woven and knitted from natural fibers, such as cotton or wool for example, but also from synthetic fibers, such as viscose, polyester, polyamide or polyacrylonitrile for example, can be treated with the amino-functional polysiloxanes of the invention. The processing agents which can be used in addition, if appropriate, can be for example chemicals for an wrinklefree finish, chemicals to improve the sewability of the textile substrate or other products typically used in textile application liquors.

The concentration in the application liquors of the preparations according to the invention is so chosen that the treated substrates contain between 0.3 and 0.6 percent by weight of the components (1) and (2) of claim 1, based on the weight of the substrate.

The examples which follow illustrate the invention. The organopolysiloxanes used in Examples 1 and 2 could each only be used at a concentration of 18 percent by weight to ensure that flowable microemulsions of good suitability for use were obtained: at higher concentrations, viscosity increased too much.

The chain lengths reported in the formulae of the examples for the indices n and m defined in claim 1 are each an average value.

EXAMPLE 1

Not Inventive

A preparation is produced by stirring up 36 grams of an organopolysiloxane having laterally positioned amino groups of the average structure

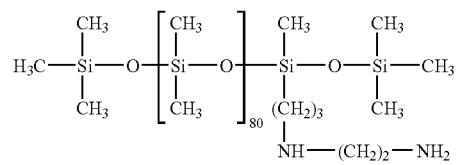

(prepared similarly to the equilibration described in DE 19829166 A1) with 0.75 gram of acetic acid 60% by weight, 20 grams of an isodecyl alcohol with 7 ethylene oxide groups, 6 grams of butyldiglycol and 137.25 grams of demineralized water at 75° C. The mixture is stirred at 70° C. for 30 minutes to form 200 grams of a water-clear microemulsion having an organopolysiloxane content of 18 percent by weight.

EXAMPLE 2

Not Inventive

A preparation is produced by stirring up 36 grams of an organopolysiloxane having laterally positioned amino groups of the average structure

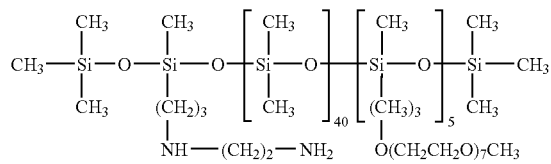

(prepared similarly to the teaching described in EP 1 174 469 A2) with 0.75 gram of acetic acid 60% by weight and 163.25 grams of demineralized water at 30° C. The mixture is stirred at 30° C. for 30 minutes to form 200 grams of a transparent microemulsion having an organopolysiloxane content of 18 percent by weight.

EXAMPLE 3

Inventive

A highly concentrated water-free self-emulsifying preparation is produced by stirring together 180 grams of an organopolysiloxane having laterally positioned amino groups and also terminally positioned and quaternized amino groups (component (1)) of the average structure

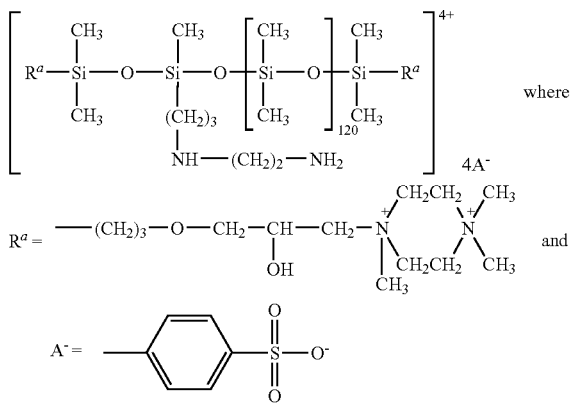

with 15 grams of a methylbis(2-hydroxyethyl)oleylammonium chloride (component (2)), mixed with 5 grams of propylene glycol (component (3)), at 30° C. to obtain 200 grams of a transparent viscous yellowish preparation having an organopolysiloxane content of 90 percent by weight. The overall nitrogen content of the organopolysiloxane is 0.8 percent by weight.

20 grams of the preparation are prediluted to a concentration of 18 percent by weight of the organopolysiloxane (component (1)) by simple stirring at room temperature into 80 grams of demineralized water to form an opalescent miniemulsion.

EXAMPLE 4

Inventive

A highly concentrated water-free self-emulsifying preparation is produced by stirring together 180 grams of the Example 3 organopolysiloxane having laterally positioned amino groups and also terminally positioned and quaternized amino groups (component (1)) and 20 grams of a tris(2-hydroxyethyl)oleylammonium acetate (component (2)) at 30° C. to obtain 200 grams of a transparent viscous bright yellow preparation having an organopolysiloxane content of 90 percent by weight. The overall nitrogen content of the organopolysiloxane is 0.8 percent by weight.

20 grams of the preparation are prediluted to a concentration of 18 percent by weight of the organopolysiloxane (component (1)) by simple stirring at room temperature into 80 grams of demineralized water to form a water-clear microemulsion.

EXAMPLE 5

Inventive

A highly concentrated water-free self-emulsifying preparation is produced by stirring together 170 grams of an organopolysiloxane having terminally positioned quaternized amino groups (component (1)) of the average structure

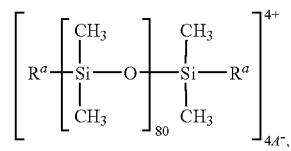

where $R^a$ and $A^-$ are each as defined in Example 3, with 20 grams of a triethanolamine dioleyl ester quaternized with dimethyl sulfate (component (2)) and 10 grams of butyldiglycol (component (3)) at 30° C. to obtain 200 grams of a transparent viscous yellow preparation having an organopolysiloxane content of 85 percent by weight. The overall nitrogen content of the organopolysiloxane is 0.8 percent by weight.

21.17 grams of the preparation are prediluted to a concentration of 18 percent by weight of the organopolysiloxane (component (1)) by simple stirring at room temperature into 78.83 grams of demineralized water to form a milky macroemulsion.

EXAMPLE 6

Inventive

A highly concentrated self-emulsifying preparation is produced by stirring together 140 grams of the Example 3 organopolysiloxane having laterally positioned amino groups and also terminally positioned and quaternized amino groups (component (1)), 30 grams of carboxymethylbis(2-hydroxyethyl)olelylammonium betaine (component (2)) and 30 grams of demineralized water (component (4)) to obtain 200 grams of a transparent viscous yellow preparation having an organopolysiloxane content of 70 percent by weight. The overall nitrogen content of the organopolysiloxane is 0.8 percent by weight.

25.71 grams of the preparation are prediluted to a concentration of 18 percent by weight of the organopolysiloxane (component (1)) by simple stirring at room temperature into 74.29 grams of dimineralized water to form a transparent miniemulsion.

Use Examples

In the use examples which follow, the as-obtained emulsions of Examples 1 and 2 and the as-prediluted emulsions of Examples 3 to 6, which each contain 18 percent by weight of the respective organopolysiloxane, were diluted with demineralized water to the test concentrations mentioned in the use examples.

The weakly acidic medium typical of conditions in commercial practice was set by adding the amounts of acetic acid which are identified under the test conditions reported below. The concentration of acetic acid was 60 percent by weight in each case.

Hand Assessment

Portions cut from bleached cotton terry toweling which had not been optically brightened were impregnated with an aqueous liquor containing 20 g/l of the emulsions produced according to Examples 1 to 6 and 0.5 g/l of acetic acid on a laboratory padder to a wet pick-up of 80 percent by weight, on weight of dry fiber, and subsequently dried at 120° C. for 2 minutes. The hand character of the test fabrics treated with the emulsions was subsequently assessed. This assessment is subject to individually different, subjective criteria. To obtain meaningful results nonetheless, at least 5 judges are to do the assessing. The results shown in the table were evaluated by statistical methods, a rating of 1 denoting the softest, most pleasant hand and a rating of 5 denoting the harshest, least surficially smooth and most unpleasant hand.

Hydrophilicity

Portions cut from bleached cotton terry toweling which had not been optically brightened were impregnated with an aqueous liquor containing 20 g/l of the emulsions produced according to Examples 1 to 6 and 0.5 g/l of acetic acid on a laboratory padder to a wet pick-up of 80 percent by weight, on weight of dry fiber, and subsequently dried at 120° C. for 2 minutes. The hydrophilicity shown in the table was subsequently assessed according to the TEGEWA drop test (Melliand Textilberichte 68 (1987), 581-583).

Alkali Stability

The stability to alkalis in finishing liquors of the emulsions produced according to Examples 1 to 6 was tested according to the hereinbelow described test:

500 ml of an aqueous liquor containing 40 g/l of the emulsions to be tested were placed into a 1000 ml glass beaker as initial charge and adjusted to pH 10 with sodium hydroxide solution (w(NaOH)=10%). The liquor was subsequently stirred with a blade stirrer at 2000 revolutions per minute for twenty minutes. Upon expiration of this time the stirrer was switched off, the foam which had formed was allowed to collapse, and the liquid surface was inspected after 1 hour for the presence of floaters (separated material which had floated to the surface of the liquid). The results are reported in the table.

Yellowing

Portions cut from bleached cotton-modal knit which had not been optically brightened were impregnated with an aqueous liquor containing 20 g/l of the emulsions produced according to Examples 1 to 6 and 0.5 g/l of acetic acid on a laboratory padder to a wet pick-up of 80 percent by weight, on weight of dry fiber, and subsequently dried at 120° C. for 2 minutes and subsequently heat set at 170° C. for 2 minutes. The whiteness shown in the table of the samples was then measured after Ganz on a "texflash 2000" whiteness meter from "datacolor international" (Switzerland).

Rub Fastness

Portions cut from a polyester fabric having a square meter weight of 200 grams and dyed with 2 percent by weight of C.I. Disperse Blue 130 were impregnated with an aqueous liquor containing 20 g/l of the emulsions produced according to Examples 1 to 6 and 0.5 g/l of acetic acid on a laboratory padder to wet pick-up of 60 percent by weight, based on weight of dry fiber, and subsequently dried at 180° C. for 1 minute. Dry and wet rub fastness was subsequently assessed on a crock meter according to DIN EN 105-X12 (results see table).

Foam Properties

Foamability was determined according to DIN 53902 using a liquor containing 2 g/l of the emulsions produced according to Examples 1 to 6 in demineralized water (results see table).

TABLE

| | Hand assessment within test series | | Hydrophilicity | Alkali stability at pH 10 | Yellowing | Rub fastness | | Foam properties |
|---|---|---|---|---|---|---|---|---|
| | | After 3 × 40° C. | Sink time in | Evaluation | Ganz | | | Foam height |
| | Original | washes | seconds | after 1 hour | whiteness | Dry | Wet | after 1 minute |
| Preparations to Example 1 (not inventive) | 1.2 | 1.3 | >180 | Oil film, floaters on surface | 136 | 2 | 2 | 70 mm |
| Preparations to Example 2 (not inventive) | 4.1 | 4.3 | <1 | Oil film, floaters on surface | 135 | 3 | 4 | 50 mm |
| Preparations to Example 3 (inventive) | 1.9 | 1.9 | <1 | No floaters | 143 | 4 | 4-5 | 40 mm |
| Preparations to Example 4 (inventive) | 1.6 | 1.3 | <1 | No floaters | 146 | 4 | 4-5 | 40 mm |
| Preparations to Example 5 (inventive) | 2.0 | 1.9 | <1 | No floaters | 141 | 3-4 | 4-5 | 0 mm |
| Preparations to Example 6 (inventive) | 2.2 | 2.0 | <1 | No floaters | 140 | 3-4 | 4 | 45 mm |
| Untreated | 5.0 | 5.0 | <1 | — | 140 | 4-5 | 5 | — |

The invention claimed is:
1. Preparations comprising, based on the overall composition,
   (1) 40 to 95 percent by weight of a fully or partially quaternized amino-functional organopolysiloxane of the general formula

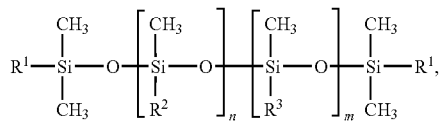

where

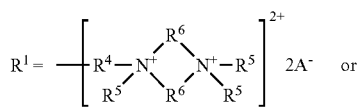

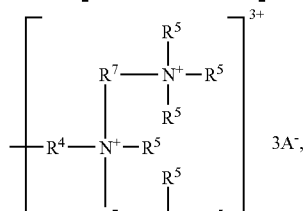

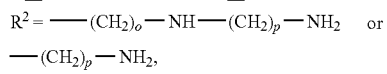

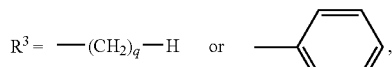

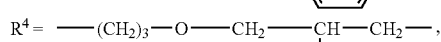

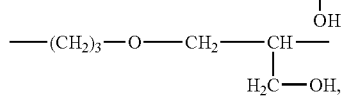

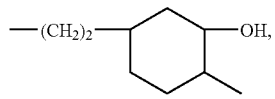

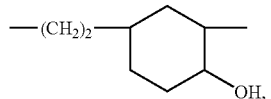

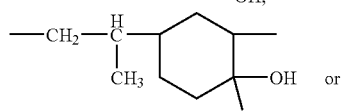

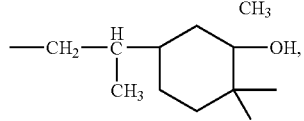

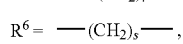

$A^-$ represents inorganic or organic anions,
n represents an integer from 0-20,
m represents an integer from 20-2000,
o, p and q each represent an integer from 1-10,
r represents an integer from 1-18,
s represents an integer from 2-3 and
t represents an integer from 2-5,
with the proviso that the total nitrogen content of component (1) is in the range from 0.05 to 2.0 percent by weight, based on the overall composition of component (1),
(2) 2 to 20 percent by weight of an alkylammonium compound of the general formula

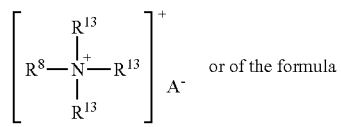

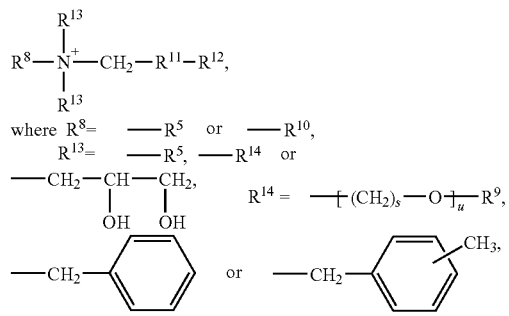

with the proviso that, when $R^8$ and $R^{13}$ in the formulae (A) and (B) are both $R^5$, the nitrogen atom bearing these residues comprises not more than two $R^5$ residues and at least one $R^{14}$ residue,

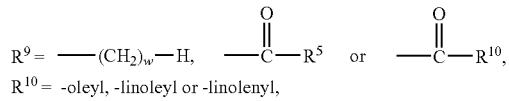

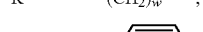

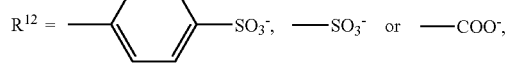

u=1-6,
w=0-20,
where $A^-$, $R^5$ and s are each as defined in connection with component (1),
(3) 0 to 20 percent by weight of an organic hydrotrope, and
(4) 0 to 20 percent by weight of water.

2. A process of finishing a textile substrate, comprising applying the preparations according to claim 1 to a textile substrate.

3. The process of claim 2, wherein the preparations are present in an aqueous liquid.

4. The process of claim 2, wherein the preparations are applied to the textile substrate by a pad application process or an exhaust process.

* * * * *